United States Patent [19]

Adamson et al.

[11] Patent Number: 5,303,789
[45] Date of Patent: Apr. 19, 1994

[54] MACHINE WITH PTO-SHAFT SUPPORT BRACKET

[75] Inventors: William H. Adamson, Lake Villa; L. Dale Baker, Naperville, both of Ill.; Paul Reilly, Manitowoc, Wis.

[73] Assignee: Case Corporation, Racine, Wis.

[21] Appl. No.: 111,272

[22] Filed: Aug. 23, 1993

Related U.S. Application Data

[63] Continuation of Ser. No. 891,647, May 29, 1992, abandoned.

[51] Int. Cl.⁵ .............................................. B60K 17/28
[52] U.S. Cl. ...................................... 180/53.1; 56/218; 180/53.3; 280/789
[58] Field of Search ............... 180/14.3, 14.2, 14.4, 180/53.1, 53.3, 53.4, 53.5; 280/638, 656, 789; 56/228, 218; 172/439, 445

[56] References Cited

U.S. PATENT DOCUMENTS

| | | | |
|---|---|---|---|
| 2,429,492 | 10/1947 | Scranton | 56/218 |
| 2,869,660 | 1/1959 | Miller et al. | 180/53.1 |
| 3,482,456 | 12/1969 | May et al. | 180/53.1 |
| 3,908,398 | 9/1975 | Braunberger | 180/14.4 |

Primary Examiner—Eric Culbreth
Attorney, Agent, or Firm—Jansson & Shupe, Ltd.

[57] ABSTRACT

The invention is an improvement in a ground-travelling machine such as an agricultural spreader having a PTO shaft for connection to a power source. The improved machine includes a bracket for supporting a shaft in a utility position. The supported shaft is thereby spaced above the ground to help keep the shaft clean and protect from damage, is readily connected to a source of power such as a tractor PTO point. The supported shaft need not be disassembled for storage.

7 Claims, 4 Drawing Sheets

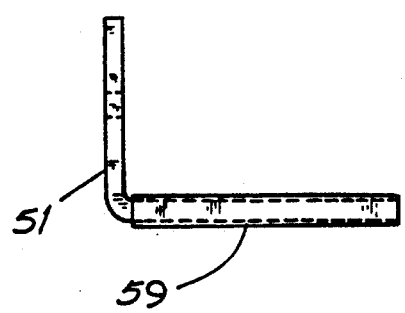

MACHINE WITH PTO-SHAFT SUPPORT BRACKET

RELATED APPLICATION

This application is a continuation of application Ser. No. 07/891,647 filed on May 29, 1992 and now abandoned.

FIELD OF THE INVENTION

This invention is related generally to powered machinery and, more particularly, to a mobile machine having a power take-off (PTO) shaft.

BACKGROUND OF THE INVENTION

Certain types of mobile machinery have "working" mechanisms driven by a separate source of power rather than by, for example, the mere movement of the machine across the ground or by a machine-mounted engine. Exemplary machines of the foregoing type include agricultural manure spreaders, forage harvesters, silage conveyors and the like.

In the case of a towed machine like a forage harvester or spreader, the engine of the towing tractor provides motive power to move both the tractor and the towed machine along the ground. Such engine also delivers power to the "working" mechanism, e.g., the spreading mechanism, through what is known as a power take-off (PTO). Usually, the PTO is a rotating splined shaft or "power point" which projects rearward a short distance from the rear of the tractor frame.

The towed machine also has a variable-length PTO shaft which can be extended to connect to the tractor PTO. When so connected (and when the machine tongue is coupled to the tractor hitch bar), the machine is towed along the ground while its working mechanism performs the intended task. Another example of such a mobile machine, a manure spreader, is shown in U.S. Pat. No. 4,220,280 (Trott et al.).

A silage conveyor (for moving silage from a wagon into a silo) might be called a "quasi-mobile" machine in that it is moved only occasionally, e.g., from silo to silo. Such a conveyor need not be moving across the ground to perform its task. However, such quasi-mobile machines are often tractor-powered through a PTO shaft and can benefit from the invention.

Machinery of the foregoing types are not without problems. For example, the machine PTO shaft typically includes two drive components, e.g., male and female "telescoping" splined shafts, one of which is readily removable. The overall length of these shafts can be adjusted to connect to different makes and configuration of tractors.

However, when the towed machine and its PTO shaft are detached from the tractor and the machine put aside, the natural tendency of the PTO shaft is to hang angularly downward and, sometimes, touch the dirt. To prevent dirt contact and possible loss, the machine user removes a shaft component (the outward splined shaft, for example) and, often, stores it by simply tossing it into or onto the machine. Otherwise, such component (which can fall off of its own weight) may become lost or dirty.

Newer machines equipped with PTO shafts have a tube-like, non-rotating shield surrounding the shaft, spaced therefrom and mounted on shield support bearings. Like the PTO shaft, the shield also has two telescoping pieces to provide a variable overall length. The shield helps protect the PTO shaft and its universal joints from dirt, chaff and the like which cause premature wear. And like the outward splined shaft, the outward shield piece is readily removable.

A shield may be made of plastic or steel. When the machine is stored, the user often removes the outward PTO shaft assembly that includes the shield and PTO shaft and stores it. A machine equipped with an angularly-downward hanging PTO shaft and shield is shown in the aforementioned patent.

An improved machine having means to support the PTO shaft and shield away from dirt and which avoids having to remove and store shaft and shield components would be an important advance in the art.

OBJECTS OF THE INVENTION

It is an object of this invention to provide an improved machine overcoming some of the problems and shortcomings of the prior art.

Another object of this invention is to provide an improved machine in which its PTO shaft is supported above the ground and in a "component-retaining" position when the machine is not in use.

Another object of this invention is to provide an improved machine which is readily stored without the necessity of removing PTO shaft and shaft shield components.

Still another object of this invention is to provide an improved machine having support means which protects the PTO shaft assembly from damage during shaft support.

Yet another object of this invention is to provide an improved machine in which the shaft support means automatically returns to a repose position when the PTO shaft is in use.

These and other important objects will be apparent from the following descriptions taken in conjunction with the drawing.

SUMMARY OF THE INVENTION

The invention is an improvement in a ground-travelling machine having a PTO shaft for connection to a power source. The invention is disclosed in connection with an exemplary item of agricultural machinery such as a spreader. However, the invention has wide utility in machines equipped with and powered through a separate PTO shaft which connects to a source of power.

The improvement includes a bracket for supporting the PTO shaft in a utility position, i.e., above the ground, out of the dirt and in a position at which it is readily available to be connected to a source of power such as a tractor PTO. While the invention can certainly be used with PTO shafts having no exterior surrounding shields, the inventive bracket is equally suitable for use with shafts having such shields.

Typically, the PTO shaft includes first and second drive components which are separably attached by sliding spline engagement. The purpose of such arrangement is to adapt the shaft to connect to PTOs which may be at varying distances from the machine. In the improved, bracket-equipped machine, the shaft is supported with its drive components conveniently attached to one another—there is no need to separate them, at least for reasons relating to cleanliness and safe storage.

The PTO shaft shield is often made of plastic but can be of metal. Since the PTO shaft is relatively heavy, the outer shield can be cracked, nicked or otherwise damaged unless special precautions are taken. Accordingly, the bracket includes a shield-protective non-metallic guard contacting the shield. The guard is preferably made of a resilient material such as rubber or neoprene.

Towed machines such as spreaders include a towing tongue for attaching the machine to the tractor. In a highly preferred embodiment, the bracket is tongue-mounted for movement between a support position and a repose position. The PTO shaft is at an elevation somewhat above the tongue and as the tractor-towed machine turns, the PTO shaft swings back and forth above and across the tongue. An interfering, upwardly-extending bracket could itself be damaged or could damage the shaft. Therefore, in the repose position, the bracket is preferably generally flush with the tongue and thereby eliminates shaft damage during turning.

By way of more specific detail, the bracket has a proximal end pivotably attached to the tongue by a bolt and when moved between the support and repose positions, the bracket pivots about an axis represented by the bolt centerline. When in the support position, the bracket has a center of gravity which "overhangs" the pivot axis. In that way, the bracket "gravity-returns" to the repose position when the shaft is moved out of contact with the bracket, i.e., when the shaft is lifted for attachment to the tractor PTO. Further details of the invention are set forth in the detailed description and the drawing.

BRIEF DESCRIPTION OF THE DRAWINGS

FIG. 4 is a side elevation view of the support bracket.

FIG. 5 is an elevation view of the support bracket of FIG. 4 taken along the viewing plane 5—5 thereof.

FIG. 6 is a top end view of the bracket of FIGS. 4 and 5 taken along the viewing plane 6—6 of FIG. 5.

DETAILED DESCRIPTIONS OF THE PREFERRED EMBODIMENTS

Figure 1:
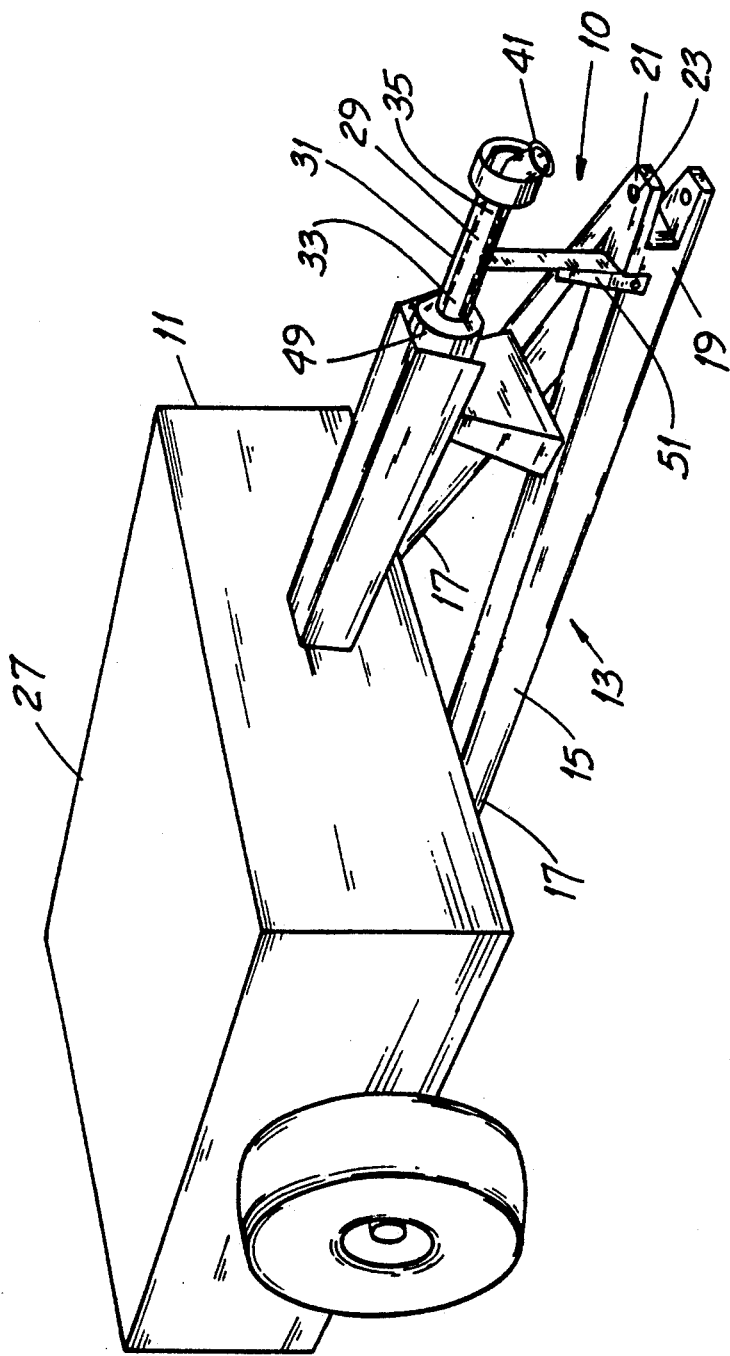
FIG. 1 is an angled front elevation view showing the machine improvement, a bracket, supporting a two-piece PTO shaft and its two-piece outer shield. The improvement is shown in conjunction with an exemplary towed machine.
Figure 2:
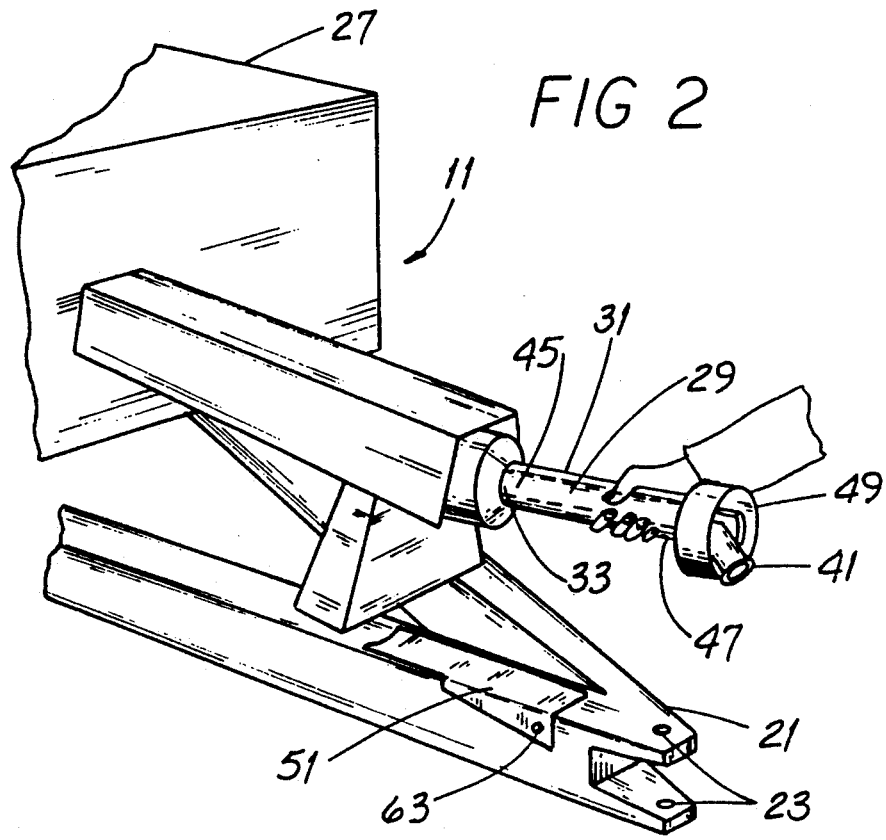
FIG. 2 is an angled front view, with parts broken away, showing the bracket in a repose position with the PTO shaft and surrounding shield lifted upward.
Figure 3:
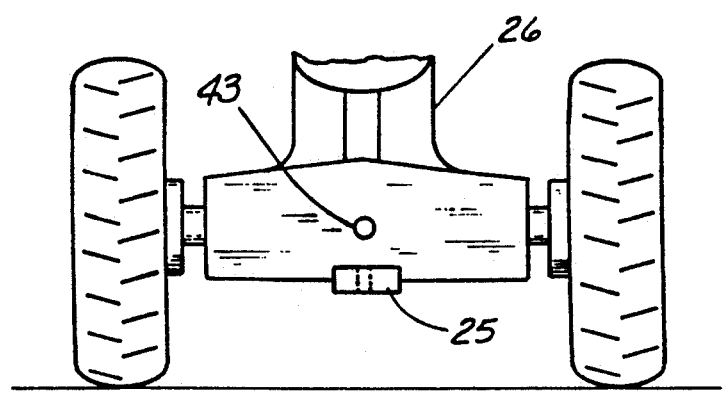
FIG. 3 is a representative rear elevation view of a rubber-tired agricultural tractor, with parts broken away, showing the tractor hitch bar and PTO.

Referring first to FIGS. 1-3, the machine improvement 10 is shown in connection with a towed machine 11 such as a spreader or the like. The machine 11 includes a tongue 13 having a pair of converging arms 15. The rear end 17 of each arm 15 is permanently attached to the machine 11 while the front ends 19 of the arms 15 converge to form a hitch point 21. The hitch point 21 has a hole 23 therethrough for attaching the tongue 13 to the hitch bar 25 of a tractor 26.

The machine 11 includes a box-like compartment 27 having an interior mechanism (not shown) which, in the exemplary spreader, "throws" the contained product out of the machine 11. Such mechanism is driven by a PTO shaft 29 surrounded by a concentric, tube-like, shield 31. The shield 31 is supported on bearings (not shown) between the shield 31 and the shaft 29 in a known manner.

The shaft 29 includes a first drive component 33 and a second drive component 35 separably attached to one another by a slideable male-female spline or other type of "slip joint" capable of transmitting torque (not shown). The second component 35 includes an attachment coupling having a universal joint (not shown) and a female splined connector 41 for attachment of the shaft 29 to the tractor PTO 43. When the machine 11 is hitched to the tractor 26 and the connector 41 coupled to the tractor PTO 43 or "power point," the tractor engine provides power to drive the machine mechanism as well as to tow the machine 11. As used herein, the phrases "first drive component" and "second drive component" means components capable of relative linear and angular movement and which can be separated, with or without the use of tools.

The shield 31 includes first and second shielding components 45 and 47, respectively. Both components 45, 47 have enlarged bell-mouthed portions 49 to accommodate at nearby universal joint. The second shield component 47 is readily detached from the first component 45 as represented by the hand grasping the second component 47 in FIG. 2.

Referring next to FIGS. 4-7, the bracket 51 is generally L-shaped in top edge view (FIG. 6) and includes a pivot mounting arm 53 and a support blade 55. Preferably, the arm 53 and blade 55 are formed as a single piece of sheet metal bent so that the arm 53 and blade 55 are at right angles to one another.

Shields 31 are often made of plastic and the PTO shaft 29 protected by the shield 31 has substantial weight. When the bracket 51 is raised to the position shown in FIGS. 1 and 7 to support the shield 31 and shaft 29, the user may inadvertently drop the shaft 29 and shield 31 onto the bracket 51 with such force that the shield 31 could be cracked or otherwise damaged. In a highly preferred embodiment, the bracket 51 includes a curved distal end 57 on which is mounted a shieldprotective, non-metallic guard 59 made of rubber or similar resilient material.

Figure 7:
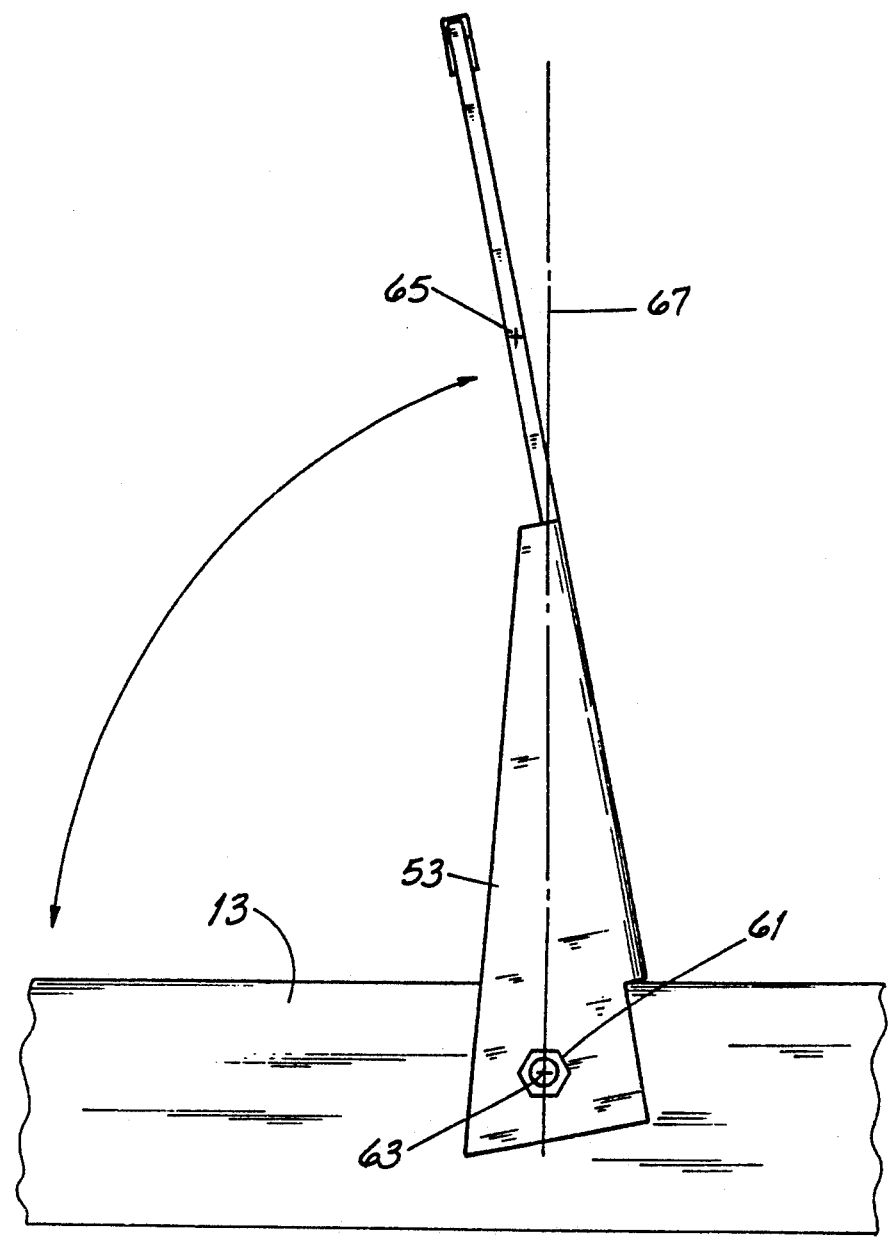
FIG. 7 is a side elevation view of the bracket mounted to the tongue of the machine shown in FIGS. 1 and 2.

Referring particularly to FIG. 7, the mounted bracket 51 (and, more specifically, the bracket arm 53) is pivotably attached to the tongue 13 by a bolt 61, the longitudinal centerline of which defines a pivot axis 63. The bracket 51 has a center of gravity 65 and when the machine tongue 13 is generally horizontal, the center of gravity 65 "overhangs" the axis 63. That is (and as viewed in FIG. 7), the center of gravity 65 is to the left of a vertical plane 67 through the axis 63. So arranged, the bracket 51 "falls" to the left (counterclockwise about the axis 63) when the shaft 29 is moved out of contact with it.

In that way, the bracket 51 is retained in the support position when the shaft 29 and shield 31 are resting thereon as shown in FIG. 1. However, when the shaft 29 is moved out of contact with the bracket 51, the bracket 51 returns, by force of gravity, to the repose position as shown in FIG. 2. The generally vertical length of the bracket 51 is selected so that when the shaft 29 and shield 31 are resting thereon, the shaft 29 and tractor PTO 43 are positionally "mismatched" and the connector 41 cannot be coupled to the PTO 43 without lifting the shaft 29, thereby causing the bracket 51 to move to the repose position.

The machine improvement 10 provides a number of important benefits. For example, the second drive component 35 and the second shielding component 47 no longer need to be removed and tossed into the machine compartment 27 to keep them clean and out of the dirt. (In fact, the user would experience quite the opposite result when such parts are tossed into a spreader compartment.) The components 35, 47 are kept clean while "in place" and in position ready for immediate use.

And when the machine PTO shaft 29 is lifted from its ready-to-use utility position for tractor hook-up, the bracket 51 automatically falls to an out-of-the-way position, thereby preventing the bracket 51 and shield 31 from being damaged by striking one another. The improvement also avoids having to unnecessarily handle the components 35, 47 at the beginning or end of machine use.

While the principles of this invention have been described in connection with specific embodiments, it should be understood clearly that these descriptions are made only by way of example and are not intended to limit the scope of the invention.

We claim:

1. In a ground-travelling machine having a PTO shaft for connection to a power source, the improvement wherein:

the machine includes a bracket which, in an upright support position, supports the shaft when the shaft is disconnected from the power source; and, when the shaft is connected to the power source, the bracket is in a folded repose position and the bracket and shaft are spaced from one another.

2. The machine of claim 1 wherein the shaft includes a shield in contact with the bracket for shaft support when the shaft is disconnected from the power source.

3. The machine of claim 2 wherein the shaft includes first and second drive components supported by the bracket.

4. The machine of claim 3 wherein the bracket includes a shield-protective plastic guard contacting the shield.

5. The machine of claim 1 including a towing tongue and wherein:

the shaft includes a shield;

the bracket is tongue-mounted for movement between the support position and the repose position; and, in the repose position, the PTO shaft and shield are protected from bracket-contact damage.

6. The machine of claim 1 including a towing tongue and the bracket has a proximal end pivotably attached to the tongue for bracket movement between a support position and a repose position.

7. The machine of claim 6 wherein:

the bracket pivots about an axis and in a pivot direction toward the tongue; and the bracket has a center of gravity spaced in the pivot direction from a substantially vertical plane through the axis, whereby the bracket gravity-returns to the repose position when the shaft is moved away from the bracket.

* * * * *